May 21, 1935.  A. N. RUSSELL ET AL  2,001,826
MACHINE FOR BALANCING HEAVY BODIES
Filed May 18, 1932  3 Sheets-Sheet 1
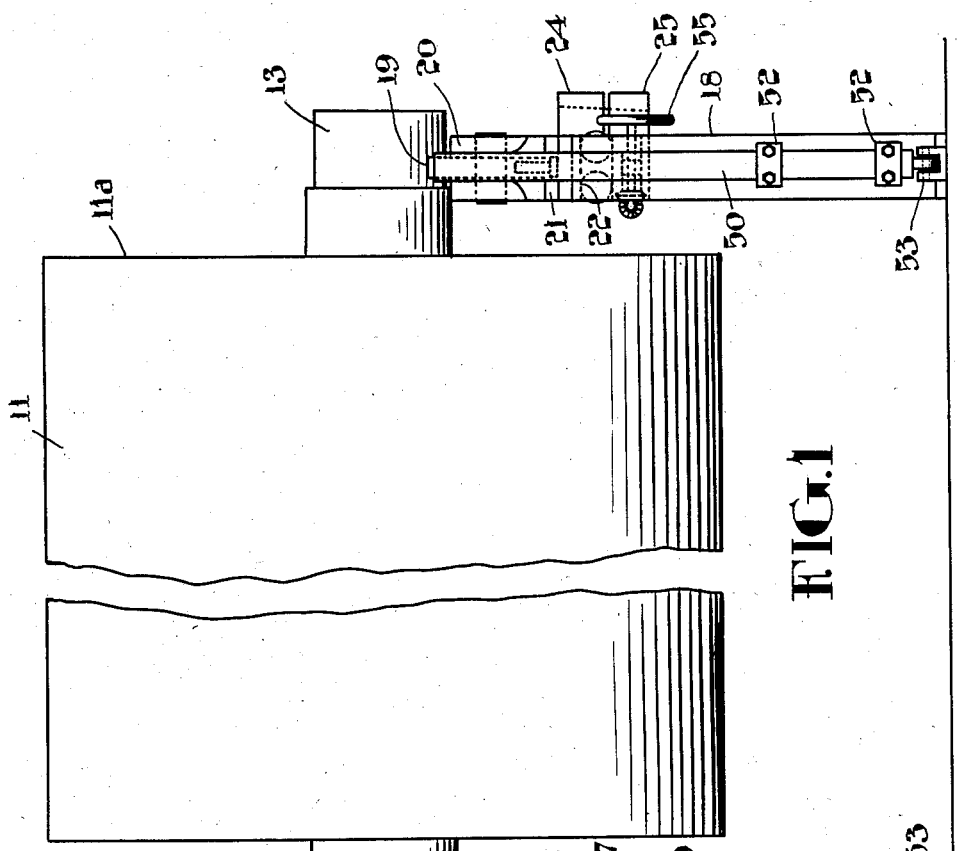
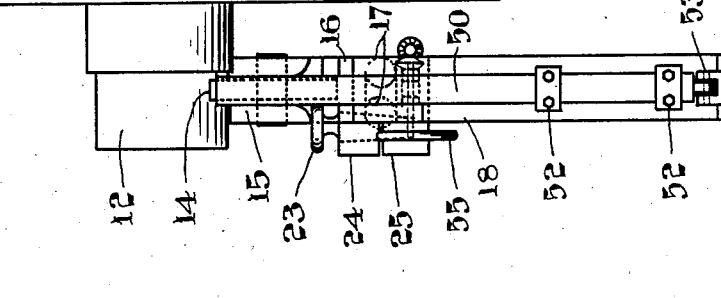
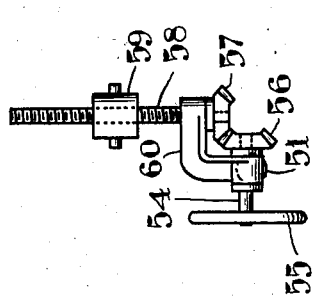
INVENTORS
A. N. RUSSELL
HANS ULMANN
BY J. D. O'Connell
ATTORNEY

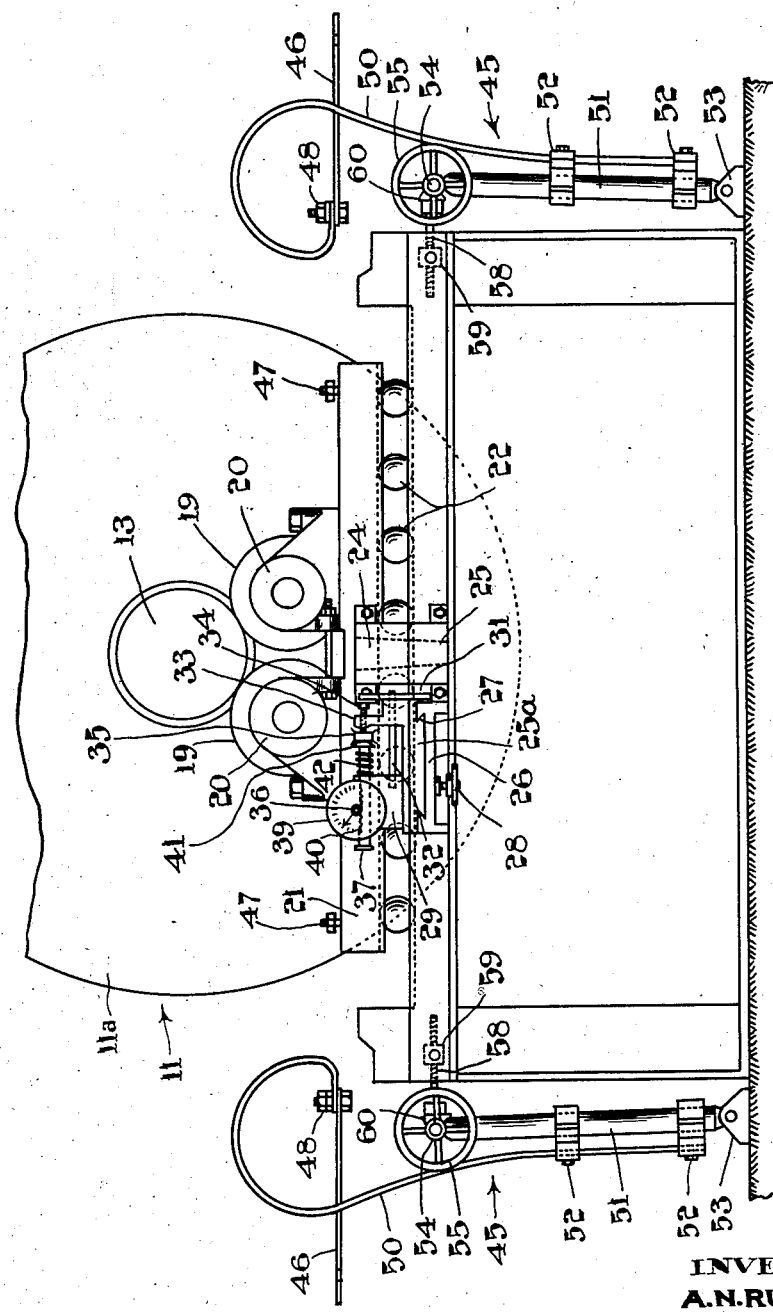

May 21, 1935.   A. N. RUSSELL ET AL   2,001,826
MACHINE FOR BALANCING HEAVY BODIES
Filed May 18, 1932   3 Sheets-Sheet 3
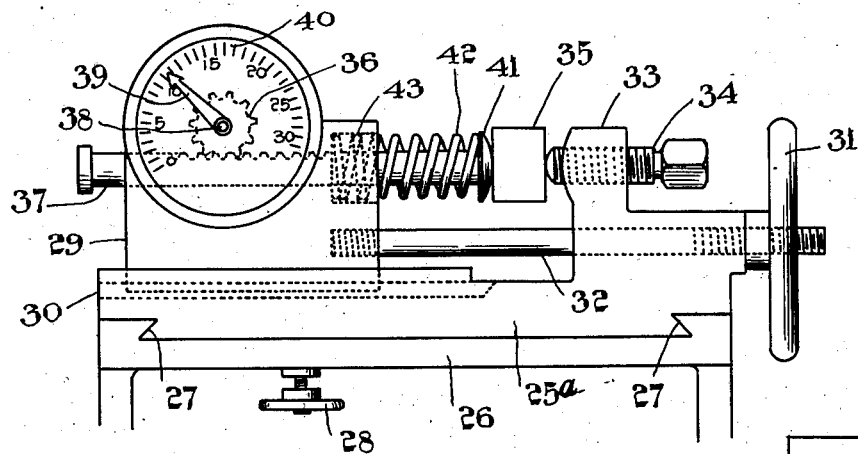
FIG.4
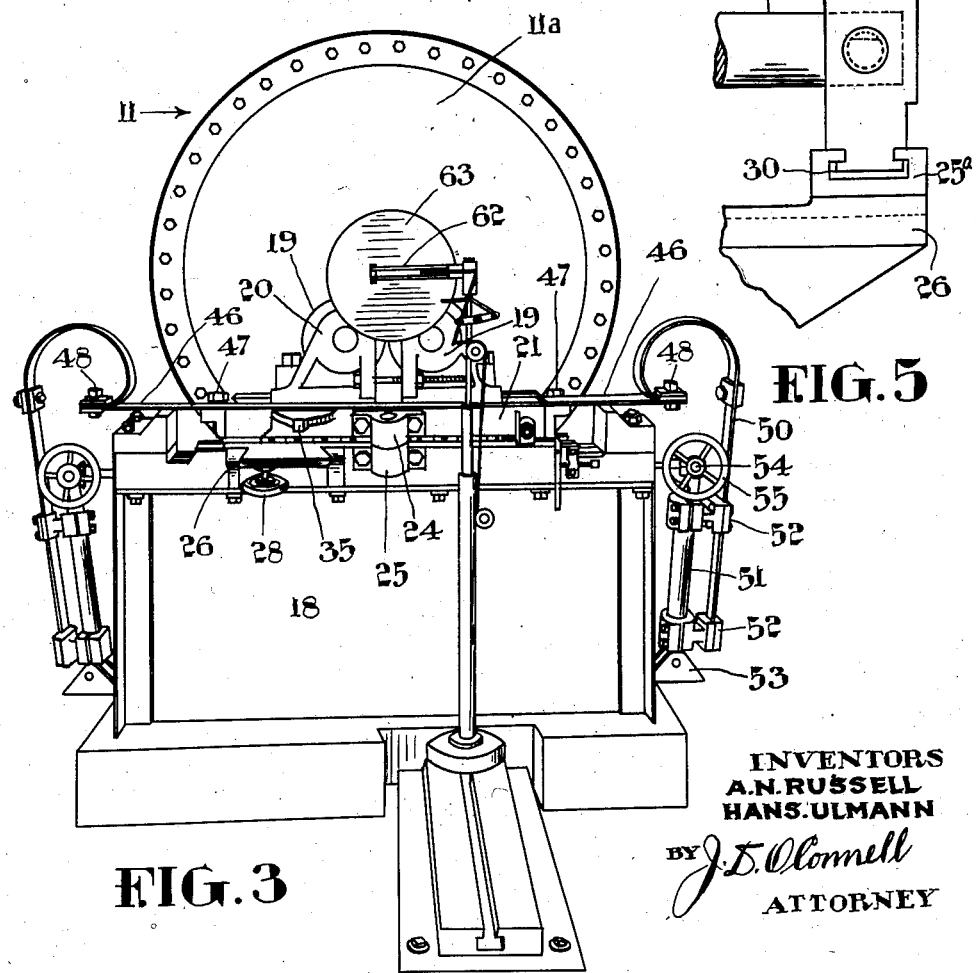
FIG.5
FIG.3
INVENTORS
A.N. RUSSELL
HANS. ULMANN
BY J.T. O'Connell
ATTORNEY Patented May 21, 1935

2,001,826

UNITED STATES PATENT OFFICE 2,001,826

MACHINE FOR BALANCING HEAVY BODIES

Andrew N. Russell and Hans Ulmann, Montreal, Quebec, Canada, assignors to Dominion Engineering Works Limited, Lachine, Quebec, Canada Application May 18, 1932, Serial No. 612,126

2 Claims. (Cl. 73—51)

This invention relates to the dynamic balancing of heavy rotary bodies and comprises a simple and efficient apparatus for correctly determining the exact amount and location of unbalance at each end of the body under investigation.

In the present instance the invention will be described in connection with the balancing of drying cylinders for paper making machines but it will be understood that the invention is equally useful in connection with the balancing of various other heavy bodies including turbine runners, paper winding drums and other rotary elements which are statically and dynamically out of balance.

The type of roll or cylinder used in a paper machine dryer is of such diameter that the amount of inertia is large with respect to the length of the roll. This, together with the inherent stiffness of construction, precludes any possibility of whip due to unbalance when the roll is operated at speeds ordinarily employed. If, however, the condition of unbalance is permitted to remain uncorrected it gives rise to excessive bearing loads, tightening and slackening of the paper sheet between the dryer rolls, and troublesome vibration throughout the dryer section when the rolls are in motion.

In balancing dryer rolls or cylinders or other rotary bodies of the type mentioned herein the present invention takes advantage of the absence of whip which permits location of the balance weights at convenient points such as the ends of the body being tested. In accordance with this invention the rotary body to be balanced is rotated in any suitable manner and is supported to oscillate in a substantially horizontal plane about an axis of oscillation which is perpendicular to the axis of rotation. The body is supported to rotate in contact with two supports engaging the ends of the body and the axis of oscillation is located at one of said supports so that the remaining end of the body and its support is free to swing or oscillate about said axis. The tendency of the body to swing as well as the actual swinging movement thereof are utilized in connection with suitable indicating devices and other instrumentalities to determine the weight corrections necessary to proper balancing of the body.

Proceeding now to a more detailed description reference will be had to the accompanying drawings, wherein Figure 1 is a view in side elevation of the supporting frame and other elements of a roll balancing apparatus constructed in accordance with this invention.

Figure 2 is an end view showing the manner in which the apparatus is used for determining the amount of unbalance characterizing the body under test.

Figure 3 is a view similar to Fig. 2 but showing the manner in which the apparatus is employed to determine the angular position of the unbalance.

Figure 4 is an enlarged view of the indicating apparatus appearing in Fig. 1.

Figure 5 is an end view of the assembly appearing in Fig. 4.

Figure 6 is a detail view of a portion of the structure appearing in Figs. 2 and 3.

The body to be balanced in accordance with this invention appears at 11 in the form of a roll of relatively large diameter equipped with end trunnions 12 and 13. The trunnion 12 is supported to rotate in the valley between a pair of supporting rollers 14 journalled in brackets 15 carried by a movable base 16, said base resting on two rows of balls 17 carried by one end of the frame structure 18. The trunnion 13 is similarly supported by a pair of supporting rollers 19 journalled in brackets 20 carried by a second movable base 21 resting on two rows of balls 22 carried by the opposite end of the frame structure 18.

The testing of the roll to determine the amount of unbalance and the weight corrections to be made at each end of the roll is effected in the following manner. The supporting base at one end of the roll (either the base 16 or the base 21) is pivotally held in a fixed position on the frame structure 18 by inserting a tapered pivot pin 23 in complementary pin receiving brackets 24 and 25. The roll rotates during the testing operation and the horizontal component of the centrifugal forces resulting from unbalanced masses in the roll tends to swing the opposite end of the roll and its supporting base about the axis of oscillation afforded by the pin 23, said axis being perpendicular to the axis of rotation. The oscillating tendency of the last mentioned base is utilized in connection with a suitable indicator for the purpose of measuring the centrifugal forces producing the oscillating impulses. Knowing the speed of the roll and having measured the centrifugal force tending to oscillate each end of the roll when the opposite end is pivotally held in a fixed position the weight corrections to be made at each end of the roll become a simple matter of computation or may be ascertained from prepared charts.

Reference will now be had to the construction and application of the above mentioned indicator, it being assumed that the base 16 is pivotally fixed to the frame structure 18 by the pin 23 so that the remote end 11a of the roll and its supporting base 21 are free to oscillate about the axis of oscillation afforded by said pin. As shown herein the indicator assembly includes a base 25a mounted on a bracket 26 carried by that end of the frame structure 18 which supports the freely movable roll base 21. In the present instance the indicator base 25a is detachably secured to the bracket 26 by the dove-tail connection 27 and the retaining screw 28 but other forms of securing means may be employed if desired. A block 29 is slidably mounted on the base 25a as indicated at 30 and is adapted to be moved along the upper surface of the base by means of a hand wheel 31 in threaded engagement with one end of a rod 32 having its opposite end fixed to said block. The rod 32 is mounted to slide in an extension 33 which projects upward from the base 25a and carries a set screw 34 arranged to engage one side of an arm 35 fixed to the movable roll base 21. The upper portion of the block 29 provides a casing containing a gear 36 engaging a driving rack 37, said gear being fixed to a shaft 38 equipped with a pointer 39 adapted to travel over a dial 40. The rack 37 slides through the block 29 and is equipped with a head 41 held against the opposite side of the arm 35 by means of a spring 42, said spring having one end engaging the head 41 and the other end seated in a recess 43. During the swinging or oscillating movement of the roll base 21 the centrifugal force may be said to follow a sine-swing. One half of this sine-swing creates a pressure against the set screw 34, the other half creating a pressure against the rack head 41 which holds the spring 42 in compression. When the pressure is on the head 41 the arm 35 and the rack 37 move in the direction of the spring deflection. During movement of the rack the deflection of the spring is magnified and visibly indicated by the pointer 39 flickering over the dial 40. In the use of this indicating apparatus the set screw 34 is initially adjusted so that, with the roll base 21 at rest, it just touches the arm 35. During the testing operation the roll 11 runs by its own momentum at a known speed and the hand wheel 31 is operated so that the rod 32 pulls the block 29 in the direction of the arm 35 and compresses the spring 42. At a certain compression of the spring 42 the flicker of the pointer 39 disappears. When the spring has been compressed to the point where the slightest lessening of the compression permits the pointer to flicker the compression force of the springs is equal to the opposing centrifugal force. The indicating mechanism is, of course, calibrated so that the compression of the spring is accurately indicated on the dial 40.

The next step in the balancing operation consists in finding the angular position of the necessary weight corrections. This is accomplished in the following manner. After the indicating mechanism has been used as described herein, it is removed and the freely movable roll supporting base, in the present instance the base 21, is then attached to a pair of spring devices generally indicated at 45. Each spring device includes a flat bar 46 having one end secured to the base 21 by a bolt 47 and the other end fastened by a pivot bolt 48 to the upper curved extremity 49 of a vertically disposed spring strip 50. The spring strip 50 is adjustably mounted on a standard 51 by means of suitable clamps 52. The standard 51 has its lower end pivoted to a supporting base 53 and is provided at its upper end with a rotatably mounted shaft 54 equipped with a hand wheel 55 and a bevel gear 56. The gear 56 meshes with a similar gear 57 fixed to a screw shaft 58 arranged to travel through a stationary nut 59 carried by the frame structure 18. The screw shaft 58 is held against travelling movement relative to the standard by a suitable bearing bracket 60 so that the standard moves with said shaft as it travels inwardly or outwardly through the nut 59. The spring devices 45, together with the roll 11 and the movable roll supporting base 21 may be said to constitute an oscillating system of a certain frequency, the axis of oscillation being represented by the pivot pin 23. The roll is now driven to a certain speed and then permitted to run out freely by its own momentum. As the roll slows down it gradually drifts through a speed at which the unbalanced centrifugal forces in the roll are in resonance with the oscillating system and the oscillations increase to the maximum. With further slowing down of the roll the oscillations gradually decrease and die down to a minimum. A graph of the oscillations may be drawn, in a well known manner, by a scriber 62 on a disk 63 fastened to the roll journal 13. The same graphs drawn with the roll rotating in opposite directions show a symmetrical picture, the symmetry line indicating the angular location of the balance weights to be applied.

From the foregoing it will be understood that both ends of the roll are balanced in turn by switching the pivot pin 23 from one roll supporting base to the other, the freely movable base being used in conjunction with the indicating assembly to determine the amount of unbalance and then being used in connection with the spring devices 45 to determine the angular location of the unbalance. During the balancing operation the roll is driven by a belt or any other suitable means arranged to permit the roll to drift down through its balancing speed without being affected by the driving mechanism. After the balancing observations are completed the exact counterbalance weights are attached each to its proper end inside the roll and the roll tested running free on both journals.

The spring strip 50 and the standards 51 may be adjusted by means of the clamps 52 and the hand wheels 53 to adjust the speed of resonance in accordance with the length, weight and moment of inertia of the body under test.

Having thus described our invention, what we claim is:—

1. Apparatus for balancing a rotating body so that the amount and location of dynamic unbalance existing in said body may be determined without changing the position of the body during the balancing operation, said apparatus comprising a pair of bearing members for rotatably supporting the ends of said body, a support on which each bearing member is mounted to move in a horizontal plane, said bearing members being normally free of springs or other restraining means tending to resist such movement, means for temporarily pivoting each bearing member in turn to its respective support to provide a vertical axis about which the companion bearing member and the body being balanced is free to oscillate, a pair of upright plate springs arranged in the path of and at opposite sides of each bearing member and means for detachably connecting the upper ends of said springs to said bearing member to form an oscillating system of a predetermined frequency, said means comprising flat bars pivoted to the upper ends of the springs.

2. Balancing apparatus comprising a frame, a bearing member slidably arranged thereon, an arm projecting from said bearing member, a base member attached to said frame and provided with a rigid abutment engaging one side of said arm, a block slidably mounted on said base, a rack member passing through said block and having an abutment at one end bearing against the opposite side of said arm, a spring encircling the rack between said abutment and said block, means for moving the block on the base in the direction of said arm to effect compression of the spring and means functioning in response to relative movement between the block and the rack for indicating the extent to which the spring is compressed during the spring-compressing movement of the block.

ANDREW N. RUSSELL.
HANS ULMANN.